(12) United States Patent
Schrimmer et al.

(10) Patent No.: US 7,244,045 B2
(45) Date of Patent: Jul. 17, 2007

(54) LED ILLUMINATED NECKLACE

(75) Inventors: Michael L. Schrimmer, Vernon Hills, IL (US); Ronald E. Gilley, Winnetka, IL (US); Ching-Hui Lee, Guang Dong (CN)

(73) Assignee: Chemical Light, Inc., Vernon Hills, IL (US)

( * ) Notice: Subject to any disclaimer, the term of this patent is extended or adjusted under 35 U.S.C. 154(b) by 0 days.

(21) Appl. No.: 11/130,513

(22) Filed: May 17, 2005

(65) Prior Publication Data

US 2006/0262531 A1    Nov. 23, 2006

(51) Int. Cl.
*F21S 13/14* (2006.01)

(52) U.S. Cl. .................. 362/252; 362/570; 362/103; 362/104; 362/108

(58) Field of Classification Search ........... 362/252, 362/570, 103, 104, 108
See application file for complete search history.

(56) References Cited

U.S. PATENT DOCUMENTS

| | | | | | |
|---|---|---|---|---|---|
| 5,074,251 | A | * | 12/1991 | Pennock | ............. 119/859 |
| 7,021,792 | B2 | * | 4/2006 | Lin | ............. 362/252 |
| 2002/0122316 | A1 | * | 9/2002 | Hsieh | ............. 362/570 |
| 2004/0037080 | A1 | * | 2/2004 | Luk et al. | ............. 362/252 |
| 2004/0246719 | A1 | * | 12/2004 | Shen | ............. 362/249 |

* cited by examiner

*Primary Examiner*—Renee Luebke
*Assistant Examiner*—Jessica McMillan
(74) *Attorney, Agent, or Firm*—Levenfeld Pearlstein, LLC

(57) ABSTRACT

An illuminated novelty device includes a plurality of light emitting diodes (LEDs). An elongated light bar can be mounted to each of the LEDs. The light bars have a light receiving end and a light emitting end and are mounted to respective LEDs at the light receiving end. The light bars are formed from a light transmissive material. Conductors extend between and connect the LEDs. The LEDs are spaced from one another along the length of the conductors. The LEDs, the elongated light bars and the conductors define an LED assembly. A power source is operably connected to the LED assembly and a switch is operably connected between the power source and the LED assembly. The power source and switch are maintained in a housing. A light transmissive sheath has the LED assembly fitted, at least in part, within it. The sheath has a first end mounted to the housing and a second free end. The LEDs are illuminated by actuation of the switch, and light from the LEDs is transmitted by the LEDs and by the light bars and is visible through the sheath.

10 Claims, 4 Drawing Sheets

LED ILLUMINATED NECKLACE

BACKGROUND OF THE INVENTION

The present invention is directed to a novelty device. More specifically, the present invention is directed to a LED illuminated necklace novelty device.

Novelty devices come in all manner, shape and size. Illuminated devices are typically more interesting and attraction-grabbing in that one's eyes are, by instinct, drawn to a lighted object. This is even more so when the lights (illumination) is colored and/or on and off in, for example, a blinking fashion.

Unfortunately, in order to create the greatest and most pleasing attraction, more and brighter lights, different colors, and blinking arrangements are needed. The power requirements of known incandescent lights is quite high. As such, light emitting diodes (LEDs) have come into favor for use in many light required areas, including use in novelty items. However, LEDs can be costly, particularly when the LEDs are manufactured in certain colors.

Another characteristic upon which the cost of an LED is based is the intensity of the LED. That is, high intensity LEDs are typically more expensive than lower intensity LEDs.

In that novelty items are often purchased in bulk or are impulse purchase items, it is important to keep the cost to consumers low. As such, the manufacturing costs must be kept commensurately low, without a loss of quality or aesthetic appeal.

Accordingly, there is a need for a high visual quality LED novelty device. Desirably, such a device is configured to permit long-term use, and provides a high output (highly visible) LED light.

BRIEF SUMMARY OF THE INVENTION

An illuminated novelty provides a high visual quality LED novelty device. The device includes a plurality of LEDs and optionally an elongated light bar mounted to each of the LEDs, each light bar having a light receiving end and a light emitting end. The light receiving end is mounted to the LEDs. The optional light bars are formed from a light transmissive material.

A plurality of conductors, such as wires, connects the LEDs. The LEDs are spaced from one another along the length of the conductors. The LEDs, the elongated light bars and the conductors defining an LED assembly.

A power source is operably connected to the LED assembly and a switch operably connects the power source to the LED assembly. A housing houses the power source and the switch.

The LED assembly is fitted, at least in part, in a light transmissive sheath. The sheath has a first end mounted to the housing and a second free end. The LEDs are illuminated by actuation of the switch, and light from the LEDs is transmitted by the diodes (and into the optional) light bars and is visible through the sheath. A connector connects the second end of the sheath to the connector.

The device includes circuitry for illuminating the light emitting diodes at certain predetermined times and intervals. The circuitry is carried on a circuit board. Preferably, the circuit board is disposed in the sheath. To effect a desired aesthetic, the LEDs are formed of at least three different colors. The circuitry can be configured such that the LEDs illuminate in a one-directional sequential flashing scheme, e.g., flashing in a circular pattern, in a two-directional sequential flashing scheme, e.g., flashing in a circular pattern in one direction and "bouncing" back, or with the LEDs flashing concurrently.

These and other features and advantages of the present invention will be apparent from the following detailed description, in conjunction with the appended claims.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying drawings, wherein.

DETAILED DESCRIPTION OF THE INVENTION

Figure 1:
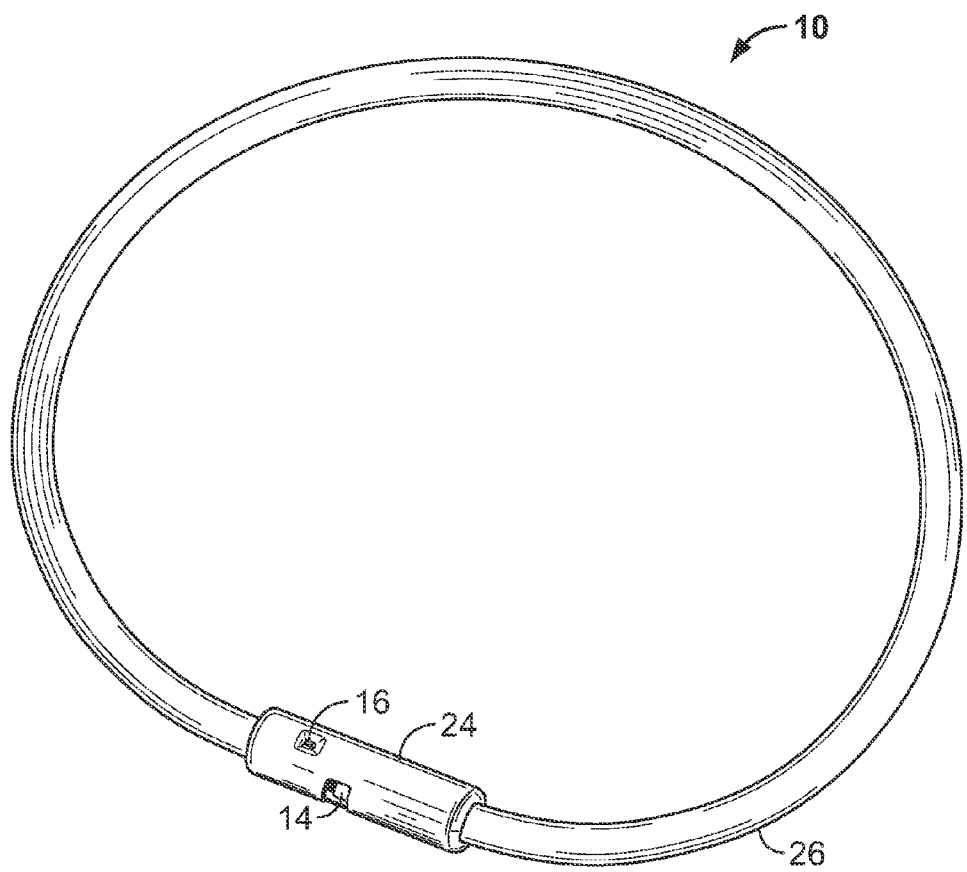
FIG. 1 is a perspective view of an LED illuminated necklace embodying the principles of the present invention.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

It should be further understood that the title of this section of this specification, namely, "Detailed Description Of The Invention", relates to a requirement of the United States Patent Office, and does not imply, nor should be inferred to limit the subject matter disclosed herein.

Referring now to the figures, and in particular to FIG. 1, there is shown an LED (light emitting diode) illuminated necklace 10 in accordance with the principles of the present invention. The necklace 10 includes an LED assembly 12, a power source 14, a switch 16, and a circuit board 18 for control of the LED assembly 12.

The LED assembly 12 is an elongated element having multiple LEDs 20a-f (collectively, 20) connected to one another both electrically and physically by conductors 22. The power source 14 and switch 16 are mounted in a housing 24 (that also functions to complete the necklace loop L). The circuit board 18 is disposed between the switch 16 and power source 14 and the LED assembly 12.

The LED assembly 12 and the circuit board 18 are disposed in a section of an elongated translucent tube or sheath 26. In a present embodiment the tube 26 is transparent, formed from a material such as TYGON® or like flexible, resilient and strong transparent material; however, it will be appreciated that the tube 26 can be translucent and/or ornamented or the like. The tube 26 is configured so that the LED assembly 12 is fitted within the tube 26 and is protected as it resides within the tube 26.

Those skilled in the art will recognize that typical LEDs are formed having a diode that is short or squat, often having a domed head and conductors extending from a rear portion. Although this type/shape of LED does in fact provide considerable illumination, the light emitted from it spreads fairly rapidly in that the light is emitted in all directions from the domed head.

The present LED assembly 12 includes a plurality of LEDs 20a-f. Optionally, each LED 20a-f has a light transmissive material in the form of an elongated light bar or light pipe 28a-f (collectively, 28) that is affixed to a respective LED 20. The optional light pipes 28 are formed from a light transmissive material, such as a translucent or transparent polymeric material such as polyethyleneterephthalate (PET) or the like. The light pipe 28 has a light receiving end 30 (the end that is mounted or affixed to its LED 20) and a light emitting end 32 opposite of the LED 20. Light is also visible though the light pipe 28 so that the light appears to be emitted from along the length $L_{28}$ of the pipe 28. Preferably, the light pipes 28 are also formed from a flexible material so that the entirety of the necklace 10 is sufficiently flexible so that it can be bent into a loop L to, for example, be fit around a user's neck.

As set forth above, the housing 24 houses the switch 16 and the power source(s) 14. In a present embodiment, three 1.5 volt batteries are carried by the housing 24 in a biased (spring 34-held) arrangement. The spring 34 arrangement holds the batteries 14 in the housing 24 in a substantially secure manner while at the same permitting ready access to the batteries for replacement.

Figure 2:
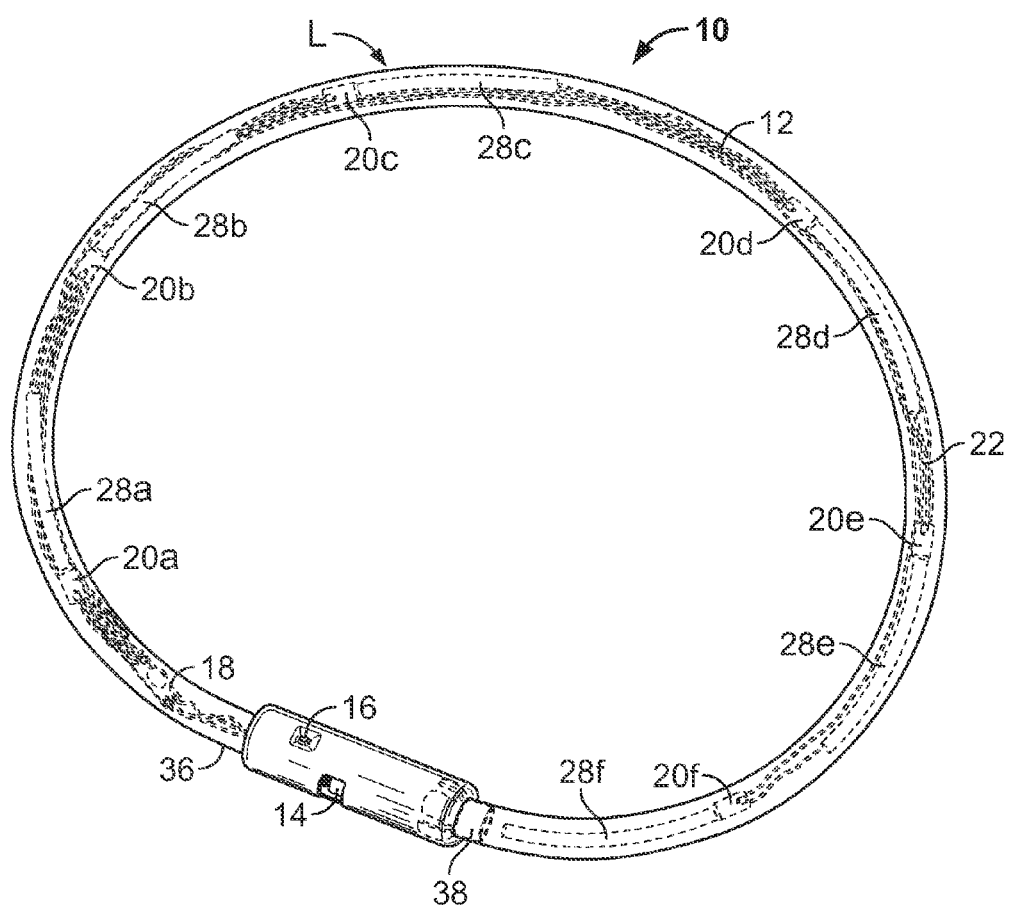
FIG. 2 is a perspective view similar to FIG. 1, showing the LED assembly components of the necklace in phantom lines.
Figure 3:
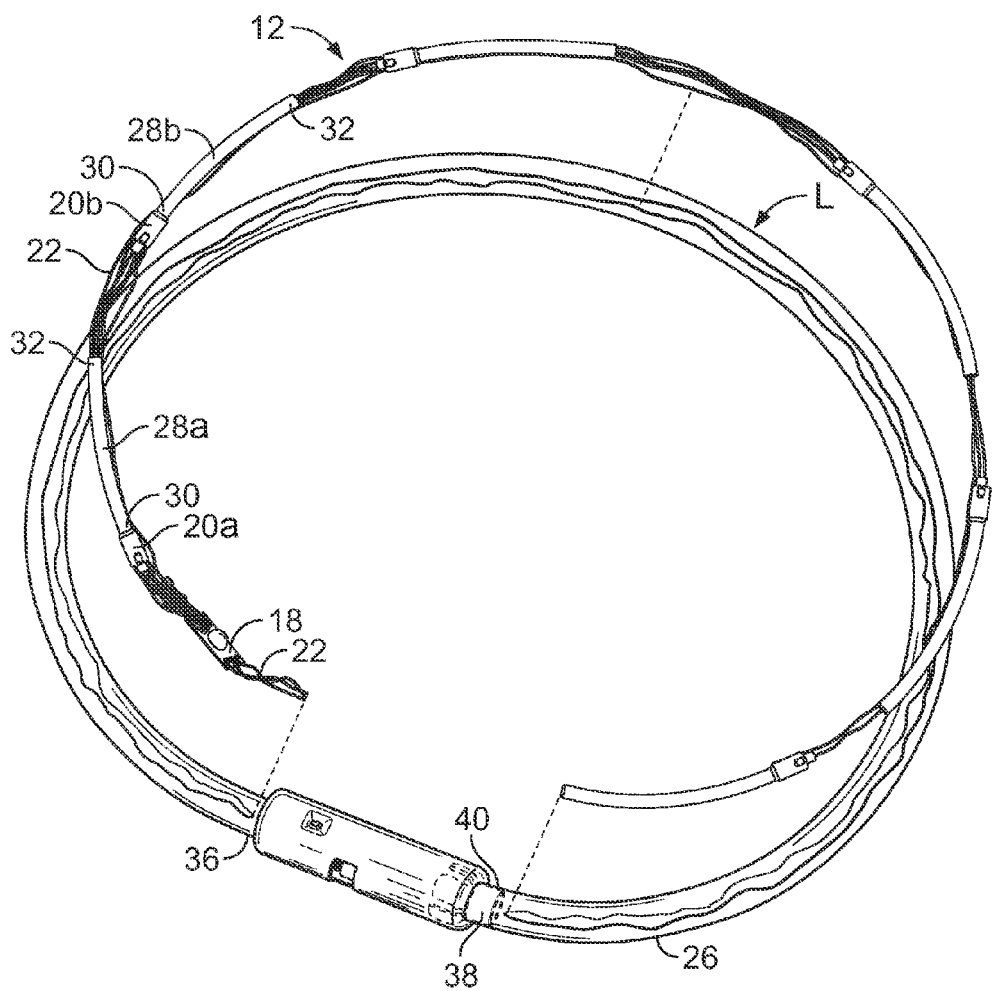
FIG. 3 is perspective view similar to FIG. 1, showing the LED assembly components in an exploded perspective.
Figure 4:
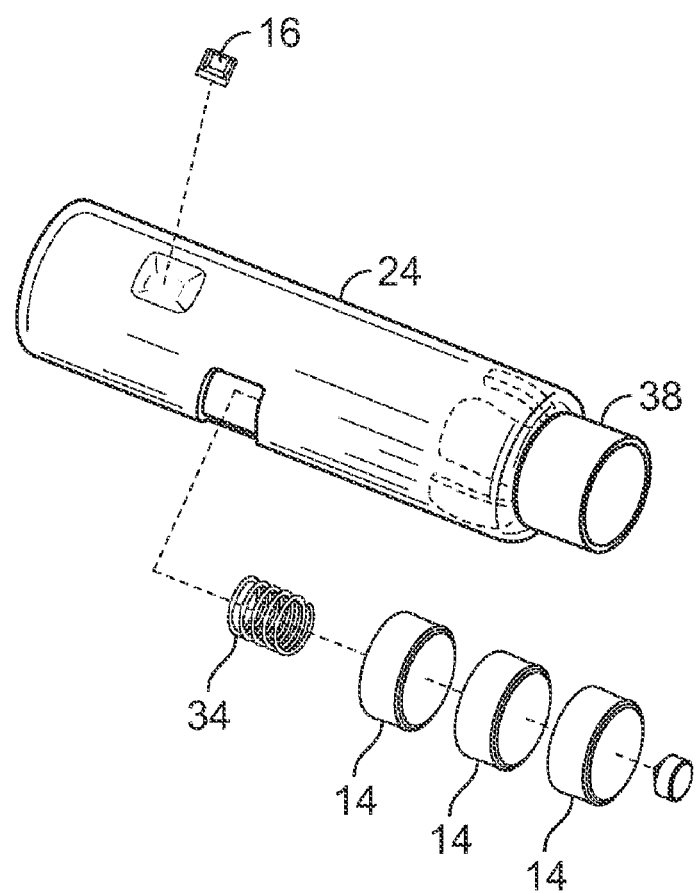
FIG. 4 is an exploded view of the necklace housing.

To facilitate manufacture and assembly, the LED assembly 12 is constructed so that the conductors 22 and the LEDs 20 are provided (fabricated) arranged in a linear (but flexible or bendable) manner as is seen in FIG. 2, in which the assembly 12 is bent into the loop L shape. That is, the assembly 12 is wired so that the circuit is formed in a linear assembly. In this manner, the assembly 12 can be inserted into 36 an end of the tube 26 and connected (wired) to the housing 24. This forms a linear lighted assembly 12. A connector 38 is fitted onto a free end 40 of the tube 26, and is fitted into the housing 24 to form the loop L.

In a present necklace 10, the assembly 12 includes six LEDs 20a-f, preferably of at least a number of different colors. The assembly 12 is configured (by the electronics on the circuit board 18) to provide a number of different lighting schemes. For example, the assembly 12 is configured to provide a one-direction sequential flashing scheme (lights appearing to move around in a circle), a two-direction sequential flashing scheme (lights appear to move one way and then "bounce" back the opposite way), and a concurrent flashing scheme (all LEDs 20a-f flashing at once) in a long duration flashing scenario and in a short duration flashing scenario.

Those skilled in the art will recognize the various uses for which such an LED assembly 12 can be made. For example, the assembly can be used in a looped configuration for a bracelet or anklet. Alternately, the assembly can be used as a linear novelty device, for example, incorporated into signs, banners and the like.

All patents referred to herein, are hereby incorporated herein by reference, whether or not specifically done so within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover all such modifications as fall within the scope of the disclosed, exemplary embodiment.

The invention claimed is:

1. An LED illuminated necklace novelty device comprising, in combination:
   a plurality of light emitting diodes in an LED assembly;
   an elongated light pipe mounted to each of the plurality of light emitting diodes, each light pipe having a light receiving end and a light emitting end, the light receiving end mounted to the light emitting diode, each light pipe formed from a light transmissive material;
   a plurality of conductors, the light emitting diodes mounted to the conductors spaced from one another along the length of the conductors, the light emitting diodes and the conductors defining the LED assembly;
   a power source operably connected to the LED assembly wherein the assembly is wired so that the circuit is formed in a linear assembly and the LEDs are connected to one another electrically and physically by the conductors in a linear manner;
   a switch operably connecting the power source to the LED assembly;
   a circuit board for control of the LED assembly by electronics on the circuit board;
   a housing for housing the power source and the switch; and
   a light transmission sheath, the LED assembly fitted, at least in part, in the sheath, the sheath having a first end mounted to the housing and a second free end,
   wherein the LED assembly is connected and wired to the power source and the switch housed in the housing, and
   wherein the light emitting diodes are illuminated by actuation of the switch and wherein light from the light emitting diodes is transmitted by the diodes and is visible through the sheath.

2. The novelty device in accordance with claim 1 including a connector fitted onto the free second end of the sheath and fitted into the housing.

3. The novelty device in accordance with claim 1 wherein the light emitting diodes are formed of at least three different colors.

4. The novelty device in accordance with claim 1 including circuitry for illuminating the light emitting diodes at certain predetermined times and intervals.

5. The novelty device in accordance with claim 4 wherein the circuitry is carried on the circuit board.

6. The novelty device in accordance with claim 5 wherein the circuit board is disposed in the sheath.

7. The novelty device in accordance with claim 4 wherein the light emitting diodes are illuminated in a one-directional sequential flashing scheme.

8. The novelty device in accordance with claim 4 wherein the light emitting diodes are illuminated in a two-directional sequential flashing scheme.

9. The novelty device in accordance with claim 4 wherein the light emitting diodes flash concurrently.

10. An illuminated novelty device comprising in combination:
   a plurality of light emitting diodes;
   an elongated light pipe mounted to each of the plurality of light emitting diodes, each light pipe having a light receiving end and a light emitting end, the light receiving end mounted to the light emitting diode, each light pipe formed from a light transmissive material;
   a plurality of conductors, the light emitting diodes mounted in linear manner to the conductors and spaced from one another along the length of the conductors, the light emitting diodes, the elongated light pipes and the conductors defining an LED assembly;

a power source operably connected to the LED assembly;

a switch operably connecting the power source to the LED assembly, wherein the assembly is wired so that a circuit is formed in a linear assembly and the LEDs are connected to one another electrically and physically by the conductors in a linear manner;

a circuit board for control of the LED assembly;

a housing for housing the power source and the switch; and a light transmissive sheath, the LED assembly fitted, at least in part, in the sheath, the sheath having a first end mounted to the housing and a second free end, wherein the light emitting diodes are illuminated by actuation of the switch, and wherein light from the light emitting diodes is transmitted by the diodes, through the elongated light pipes and is visible through the sheath.

* * * * *